(12) United States Patent
Nuzman et al.

(10) Patent No.: US 7,751,320 B2
(45) Date of Patent: Jul. 6, 2010

(54) ADMISSION CONTROL OF SESSIONS WITH PREFERENCE LISTS

(75) Inventors: Carl Jeremy Nuzman, Union, NJ (US); Indra Widjaja, Florham Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 832 days.

(21) Appl. No.: 11/541,276

(22) Filed: Sep. 30, 2006

(65) Prior Publication Data

US 2008/0080374 A1   Apr. 3, 2008

(51) Int. Cl.
  *G01R 31/08* (2006.01)
  *H04L 12/28* (2006.01)
  *H04J 3/16* (2006.01)
  *G06F 15/16* (2006.01)

(52) U.S. Cl. .................... 370/230; 370/235; 370/395.2; 370/468; 709/232

(58) Field of Classification Search .................. 370/230, 370/235, 392.2, 395.21, 395.41, 394.43, 370/469, 395.2; 709/232–234
See application file for complete search history.

(56) References Cited

U.S. PATENT DOCUMENTS

| | | | |
|---|---|---|---|
| 6,215,768 B1 * | 4/2001 | Kim | 370/230 |
| 6,233,223 B1 * | 5/2001 | Sabry et al. | 370/230 |
| 6,839,767 B1 * | 1/2005 | Davies et al. | 709/232 |
| 6,922,564 B2 * | 7/2005 | Witana | 455/452.2 |
| 6,947,445 B1 * | 9/2005 | Barnhart | 370/468 |
| 7,024,203 B1 * | 4/2006 | Naghian | 455/453 |
| 7,180,853 B1 * | 2/2007 | Petajisto | 370/220 |
| 7,362,776 B2 * | 4/2008 | Meier et al. | 370/468 |
| 7,366,134 B2 * | 4/2008 | Bose et al. | 370/329 |
| 7,577,161 B2 * | 8/2009 | Li et al. | 370/468 |
| 2003/0039246 A1 * | 2/2003 | Guo et al. | 370/389 |
| 2003/0063624 A1 * | 4/2003 | Nagarajan et al. | 370/468 |
| 2004/0240399 A1 | 12/2004 | Corrao et al. | 370/260 |

(Continued)

FOREIGN PATENT DOCUMENTS

EP   1 248 431 A1   10/2002

OTHER PUBLICATIONS

U.S. Appl. No. 11/488,280, filed Jul. 18, 2006, Daoud et al.

(Continued)

*Primary Examiner*—Steven H Nguyen
*Assistant Examiner*—Candal Elpenord
(74) *Attorney, Agent, or Firm*—John F. McCabe

(57) ABSTRACT

A method includes receiving a request for admission of a new communications session to a data network. The requested admission is such that the new communications session is granted a first set of one or more bandwidth usages of a resource of the network in response to being admitted. Each of one or more admitted communications sessions concurrently has a granted set of one or more bandwidth usages of the resource. The method includes admitting the new communications session to the data network in response to a sum over each set of the largest bandwidth usage of the resource in the each set being larger than an effective input bandwidth of the resource. Each admitted communications session is able to access a bandwidth of the resource up to any of the one or more bandwidth usages in its own one of the sets.

20 Claims, 6 Drawing Sheets

U.S. PATENT DOCUMENTS

2005/0237952 A1    10/2005    Punj et al. ................... 370/260
2006/0077962 A1*    4/2006    Wu et al. ..................... 370/352

OTHER PUBLICATIONS

Widjaja, I., "Next Generation Network Architectures with Decoupled Service Plane and Transport Plane," Broadnets 2006, Oct. 1-5, 2006, San Jose, 10 pages.

IETF RFC 3264, "An Offer/Answer Model with Session Description Protocol (SDP)," Jun. 2002, 24 pages, by Network Working Group.

PCT International Search Report dated Mar. 13, 2008 (PCT/US2007/020525) 5 pages.

* cited by examiner

ADMISSION CONTROL OF SESSIONS WITH PREFERENCE LISTS

BACKGROUND

1. Technical Field

The invention relates to communications sessions on data networks.

2. Discussion of the Related Art

This section introduces aspects that may be helpful to facilitating a better understanding of the inventions. Accordingly, the statements of this section are to be read in this light. The statements of this section are not to be understood as admissions about either what is in the prior art or what is not in the prior art.

Some data network architectures include separate service and transport planes. The service plane handles control functions related to communications sessions, e.g., control functions related to admission, setup, and termination of communication sessions. The service plane uses one or more special protocols to support control messages for its control functions, e.g., Session-Initiation Protocol (SIP) and Session Description Protocol (SDP). The transport plane handles the routing and delivery of data carrying user packets. The transport plane may use a variety of transport and control protocols, e.g., Real-time Transport Protocol (RTP), Internet Protocol (IP), and User Datagram Protocol (UDP). While the service and transport planes perform different functions, there is often a need to transport control information and data between these two planes. Indeed, the network architecture may include, e.g., one or more other entities that support the transport of such information and data so that requests from the service plane can be performed at the transport plane.

At the service plane, the communications protocol typically enables users connected to edge network nodes to request access to network resources in messages that request and negotiate new communications sessions. The network resources may include port(s) of network node(s), codecs for handling specific media data, policing devices for monitoring communications sessions, and/or marking devices for adjust quality-of-services (QoSs) of data packets. At the service plane, some protocols further enable the users, which are connected to edge nodes, to reserve access to a list of alternate network resources, e.g., alternate codecs for processing of data during the communications session. Such users will then, be able to select a codec from the list as appropriate to process data during the communication session.

One communications protocol with the above-discussed characteristics is SDP. In SDP, message(s) for requests to admit a new communications session and/or message(s) for replying to such requests may include session parameter data similar in form to the following data:

m=audio 3587 RTP/AVP 18 96 2 15 0
a=rtpmap:96 i:LBC/8000
a=sendrecv

The above session parameter data designates that audio data be received on port 3587 via the RTP/AVP protocols and be treated by one of five codecs identified on the SDP message's preference list. The preference list identifies the five codecs as 18, 96, 2, 15, and 0. If the communications session is admitted, a user who is connected to the source or destination node will be able to use any of the five codecs on this list to treat audio data of the communications session at the port 3587. At one time, any one of the codecs on the preference list can be designated to treat such audio data for the communications session, and the codec so designated may be changed during the communications session. The codecs on such a preference list may have different input bandwidth requirements.

At the service plane, messages requesting admission of a new communications session and/or messages replying to such request messages may include requests to support data of other media types. For that reason, SDP messages may include other preference lists. The other preference lists may indicate codec(s) for treating of data of other media types during the communications session.

BRIEF SUMMARY

A first method includes receiving a request for admission of a new communications session to a data network. The requested admission is such that the new communications session is granted a first set of one or more bandwidth usages of a resource of the network in response to being admitted. Each of one or more admitted communications sessions concurrently has a granted set of one or more bandwidth usages of the resource. The method includes admitting the new communications session to the data network in response to a sum being larger than an effective input bandwidth of the resource. The sum sums the largest bandwidth usage in the each of the sets. Each admitted communications session is able to access a bandwidth of the resource up to any of the one or more bandwidth usages in its own one of the sets.

In some embodiments of the first method, the step of admitting includes predicting a total bandwidth usage of the resource by the new communications session. In some such embodiments, each set may be a preference list. In some such embodiments, the predicted total bandwidth may depend on the order of the bandwidth usages in the preference lists.

In some embodiments of the first method, the resource is a port on a node in the data network.

In some embodiments of the first method, the request indicates a probability that each bandwidth usage of the set of the request will be used by the communications session in response to being admitted to the network.

In some embodiments of the first method, the act of admitting is such that the new communications session is granted a set of one or more bandwidth usages on another resource of the network. Each of one or more admitted communications sessions concurrently has a granted set of one or more bandwidth usages on the another resource. A sum is larger than an effective input bandwidth of the second resource. The sum sums the largest bandwidth usage of each granted set of one or more bandwidth usages on the another resource. Each admitted communications session is able to access bandwidth of the second resource up to any of the one or more bandwidth usages in its own sets.

A second method includes sending a request for admission of a new communications session to a data network. The admission is such that the new communications session is granted a set of one or more bandwidth usages of a resource of the network in response to being admitted. Each of one or more admitted communications sessions concurrently has a granted set of one or more bandwidth usages of the resource. The method includes receiving a message admitting the new communications session to the data network in response to a sum being larger than an effective input bandwidth of the resource. The sum sums the largest bandwidth usage of the resource in the each of the sets. Each admitted communications session is able to access a bandwidth of the resource up to any of the one or more bandwidth usages in its own one of the sets.

In some embodiments of the second method, the resource is a port on a node in the data network.

In some embodiments of the second method, the request indicates a probability that each bandwidth usage of the set in the request will be used by the communications session in response to being admitted to the network.

In some embodiments of the second method, each set is a preference list.

In some embodiments of the second method, the admission grants a set of one or more bandwidth usages on another resource of the network to the new communications session. Each of one or more admitted communications sessions concurrently has a granted set of one or more bandwidth usages on the another resource. A sum of the largest bandwidth usage of each granted set of one or more of bandwidth usages on the another resource is larger than an effective input bandwidth of the another resource. Each admitted communications session is able to access bandwidth of the another resource up to any of the one or more bandwidth usages in its own sets of bandwidth usages on the another source.

Various devices include data storage media that are encoded with programs of instructions in computer-executable forms. The instructions of such program are configured to perform the steps of one of the above-described methods. In particular, the above methods may be encoded in to machine-executable programs stored on such data storage media.

Herein, various embodiments are described more fully by the Figures and the Detailed Description of Illustrative Embodiments. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

Figure 1:
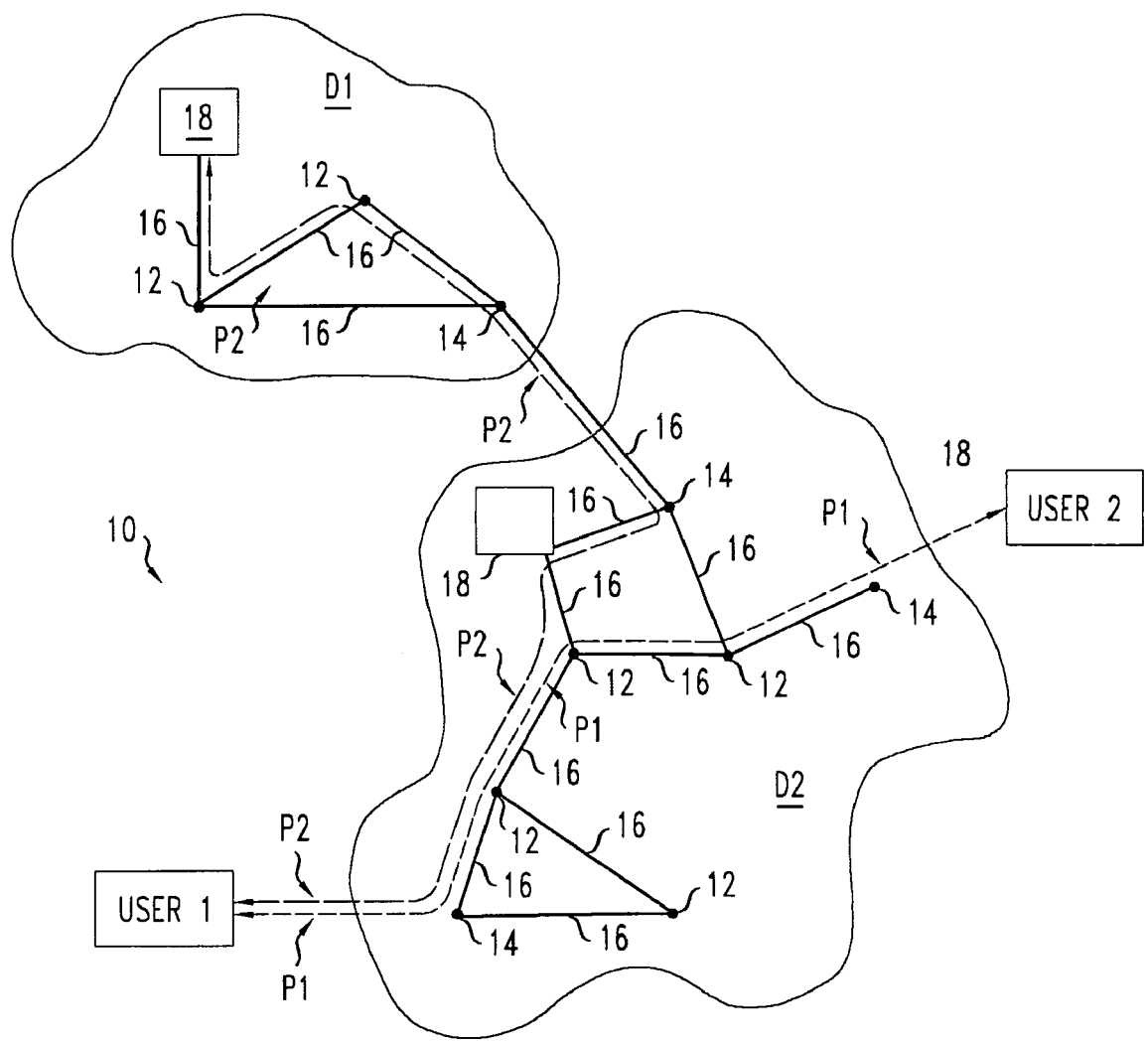
FIG. 1 illustrates a portion of an exemplary data network that supports both a service plane and a transport plane.

FIG. 1 illustrates a portion of an exemplary embodiment of a data network 10 that supports a service plane (SP), a transport plane (TP), and a resource control function (RC). The service plane controls the management of communications sessions in the data network 10. In particular, the service plane may control the establishment of communication sessions, the negotiation of parameters of communication sessions, and the termination of communications sessions. The transport plane controls the actual transport of data, e.g., user packets carrying data for various media types, between source and destination nodes. The resource control function, enables the exchange of control and monitoring information between the service plane, SP, and the transport planes, TP, and performs, e.g., the admission control of communication sessions. The resource control function may be part of the service and/or transport planes or may be an intermediator between the service and transport planes.

The data network 10 includes core nodes 12, edge nodes 14, links 16 that connect the nodes 12, 14, and one or more servers 18. The nodes 12, 14, and links 16 support the transport plane and generally support the transport of user data. The edge nodes 14 can connect users, e.g., USER 1 and USER 2, to the data network 10. The one or more servers 18 store a copy and/or portions of copies of one or more control entities in computer executable forms on data storage devices therein. For example, the servers 18 may store in computer-executable forms one or more of the control entities that support the service plane and/or one or more intermediators, e.g., the RC, between the service and transport planes.

Herein, various embodiments of the data network 10 may have different numbers of nodes 12, 14, links 16, and/or servers 18, different topologies and/or different transport media, e.g., wireless or wired media. The data network 10 may support either circuit-based or circuit-less communications between the nodes 12, 14.

Often, control software for the service plane and for transport plane is located on different network devices. For example, the control software for the service plane is often stored in the separate servers 18. That is, said control software is stored in computer readable form on data storage media in the separate servers 18. In contrast, the control software for the transport plane is often stored in the network nodes 12, 14. That is, said control software is stored in computer readable form on data storage media in the nodes 12, 14. Indeed, data is often transmitted along different paths at the transport plane and the service plane, e.g., as illustrated by the respective paths p1 and p2.

The various embodiments of the data network 10 may support a variety of conventional communication architectures, standards and/or formats. Exemplary embodiments may comply, e.g., with communications architectures and/or standards under the third Generation Partnership Project (3GPP), 3GPP2, ETSI TISPAN, ITU-T Next-Generation Network (NGN), PacketCable PS, and/or IP Mulitmedia Subsystem (IMS). Exemplary embodiments may support, e.g., at the service plane, protocols such as SIP and/or SDP and, e.g., at the transport plane, protocols such as IP, MPLS and/or asynchronous transmission mode (ATM).

The data network 10 may have a single domain or multiple domains. For example, the illustrated embodiment has two domains D1 and D2. Such separate domains D1 and D2 may be controlled by different entities or companies and may employ different communications protocols.

In various embodiments, the data network 10 is configured to reserve network resources and/or portions thereof to support the individual communications sessions thereon. Exemplary network resources include ports on nodes, e.g., ports on edge nodes, policing device monitors, and marking devices that can effectively change quality-of-services of data packets. A network resource such as a port of a network node may be characterized by a total bandwidth and an available bandwidth, e.g., an unused part of the total bandwidth.

In circuit-based and datagram-based embodiments of the data network, such reservations may include the set up of entry gates at the edges of the data network, e.g., admission control. Such reservations may also include setting up bandwidth reservations at various locations in the data network 10, e.g., at ports on edge nodes. The network's control entities decide whether to admit a new communications session based, in part, based on the sizes of the requests for network resource in the requests for new communications session and the current availabilities for said network resources. The control entities also typically decide how to reserve requested network resources in a way that accommodates the needs of the current communication sessions. Often, such decisions, which relate to requests for network resources, involve edge resources such as ports on nodes and bandwidths on such ports.

Figure 2:
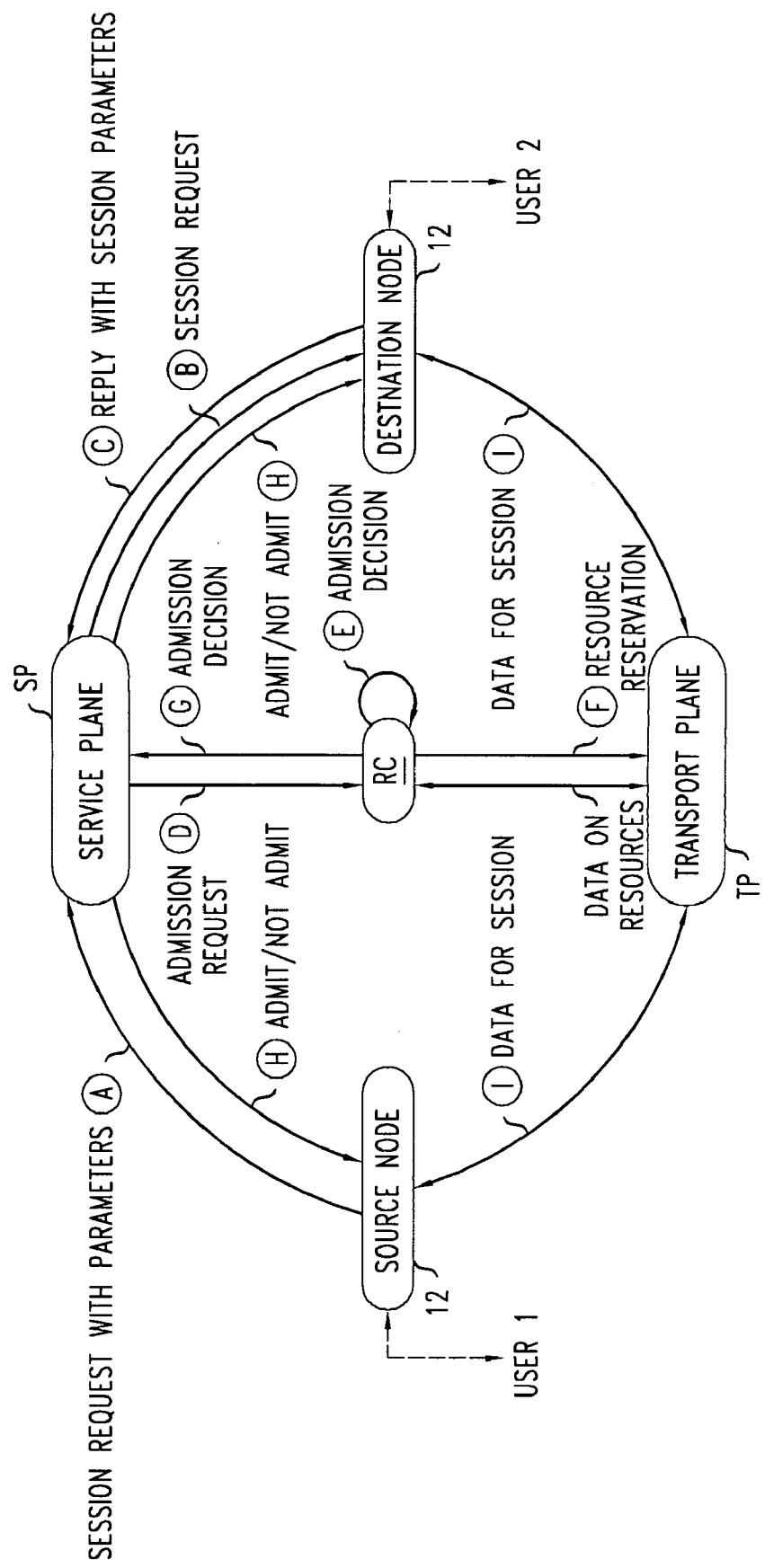
FIG. 2 schematically illustrates an exemplary process for admitting a new communications session on the data network of FIG. 1.

FIG. 2 schematically illustrates the interactions between the various entities of the data network 10 of FIG. 1. The illustrated entities include the service plane (SP), the transport plane (TP), a resource control function (RC), and users, i.e., USER 1 and USER 2. The users connect to edge source and destination network nodes 14.

FIG. 2 illustrates a process for setting up a new communications session between USERs 1 and 2. In the set up process, the source node 12 transmits a request to admit the new communications session to the service plane (step A). The request includes session parameters and identifies one or more destination nodes 12 for the communications session. The request may be, e.g., a SIP message having a portion in the SDP format or in another format. In response to receiving the request, the service plane typically transmits a portion of the request to the destination node 12 to enable negotiation of the session parameters (step B). Then, the destination node transmits a reply to the service plane with acceptable session parameters (step C). The reply may have the same format or a similar format to the request from the source node. In response to receiving the reply, the service plane may transmit an admission request to the resource control function, RC (step D). The transmitted admission request may include the negotiated parameters for the communications session as determined by the service-plane communications with the source and destination nodes. In response to receiving the admission request, the resource control function determines whether to admit or reject the request for the new communications session (step E). The determination of the resource control function is based, at least in part, on the network resource availabilities at the transport plane, e.g., availabilities of edge resources. For example, the resource control function may base such admit/not admit decisions on quality of service requirements of the current and requested communications sessions. The resource control function may communicate with one or more network elements or functions of the transport plane to obtain data on resource availability and in some embodiments, may obtain data on current resource usage.

If the requested new communications session is admitted, the resource control function transmits one or more messages to the transport plane to effectively reserve resource(s) for the accepted new communications session (step F). For example, the messages may request that the transport layer set up gates, traffic policers, packet markers, etc. to allow the transmission of the communications session's user media data between the source and destination nodes with the requested quality-of-service. Next, the resource control function transmits the decision to admit or not admit the requested new communications session to the service plane (step G). Then, the service plane transmits a "session admitted" or a "session not admit- ted" decision to the source and destination nodes via the service plane protocol (step H). This service plane communication may include admitted parameters for the communications session if the communications session is accepted.

In response to receiving a "session admitted" decision, the source node and/or destination node transmit data for the communications session, e.g., to each other, via the transport plane (step I).

Other embodiments of the data network 10 of FIG. 1 may support different message exchange sequences that involve the service plane, transport plane, and resource control function to establish a new communications session.

For example, the data network may support either a pull control model as well as a push control model. In the pull control model, steps A-E of the above-described method for setting up a communications session are still performed. Then, the resource control function returns an admission token to one of the users at step F if the decision at step E was to admit the communications session. Then, the admission token is returned to the user, e.g., via a message through the service plane. If the communications session has been admitted, one of the users then, sends a signaling message, e.g., via RSVP, to the transport plane in order to reserve network resources. In response, the transport layer pulls information for installing a gate for the communications session via the resource control function. Then, the transport layer acknowledges the signaling request to the user, and the users can start transferring data via the admitted communications session.

Termination of a communications session would typically involve similar exchanges messages between the source and destination nodes at the service plane and between the resource control function and the service and transport planes.

The embodiments include methods for deciding whether to admit a new communications session based on the current availability of network resources that are requested for the new communications session, e.g., at step E of FIG. 2. Such admission decisions may be based on one or more preference lists for said one or more network resources, e.g., network resources on edge nodes. Such preference lists may be in the initial request from the source node to the service plane at step A, the reply from the destination node to the service plane at step C, and any negotiated session parameters in the request from the service plane to the resource control function at step D. Indeed, the resource control function typically uses data corresponding to such preference list(s) in making the admission decision at step E of FIG. 2. The preference list may be in the request for the new communications session and/or in the reply by that destination node to such a request made during the negotiations for the communications session's parameters, e.g., as in illustrated in FIG. 2.

Figure 3A:
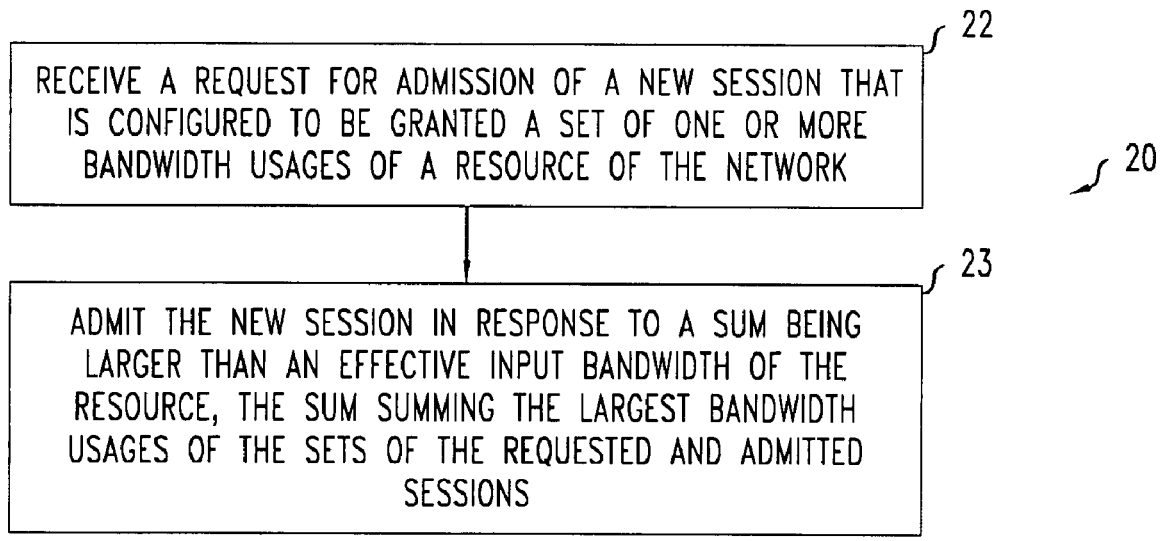
FIG. 3A is a flowchart that illustrates one exemplary method for treating a request to set up a new communications session on a data network, e.g., on the data network of FIGS. 1-2.

FIG. 3A illustrates a method 20 for handling a request to set up a new communications session on a data network, e.g., in the service plane and/or resource control function FIG. 2. The method 20 includes receiving a request for admission of a new communications session to the data network (step 22). The requested admission is such that the new communications session will be granted a first set of one or more bandwidth usages of a resource of the network in response to being admitted. Each admitted communications session concurrently has a granted set of one or more bandwidth usages of the resource. The method 20 includes admitting the new communications session to the data network in response to a sum being larger than an effective input bandwidth of the resource (step 23). The sum is a sum of the largest bandwidth usage in the each of the sets of bandwidth usages. Each admitted communications session is able to access a bandwidth of the resource up to any of the largest bandwidth usage in its own one of the sets.

Figure 3B:
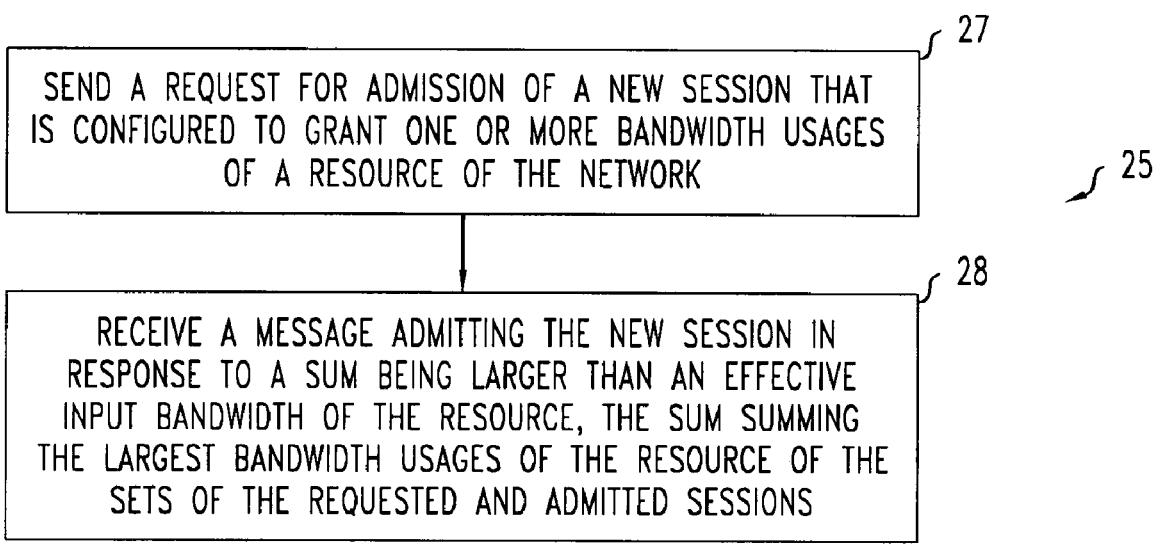
FIG. 3B is flowchart illustrating one exemplary method for interacting with service plane to set up a new communications session on a data network, e.g., on the data network of FIGS. 1-2.

FIG. 3B illustrates one exemplary method 25 for interacting with the service plane to set up a new communications session on a data network, e.g., the service plane of FIG. 2. The method 25 includes sending a request for admission of a new communications session to a data network, e.g., to the service plane therein (step 27). The requested admission is configured such that the new communications session is granted a set of one or more bandwidth usages of a resource of the network in response to being admitted. Each of one or more admitted communications sessions concurrently has a granted set of one or more bandwidth usages of the resource. The method 25 includes receiving a message admitting the new communications session to the data network in response to a sum being larger than an effective input bandwidth of the resource (step 28). The sum sums the largest bandwidth usage of the resource in each of the sets. Each admitted communications session is able to access a bandwidth of the resource up to any of the one or more bandwidth usages in its own one of the sets.

Figure 3C:
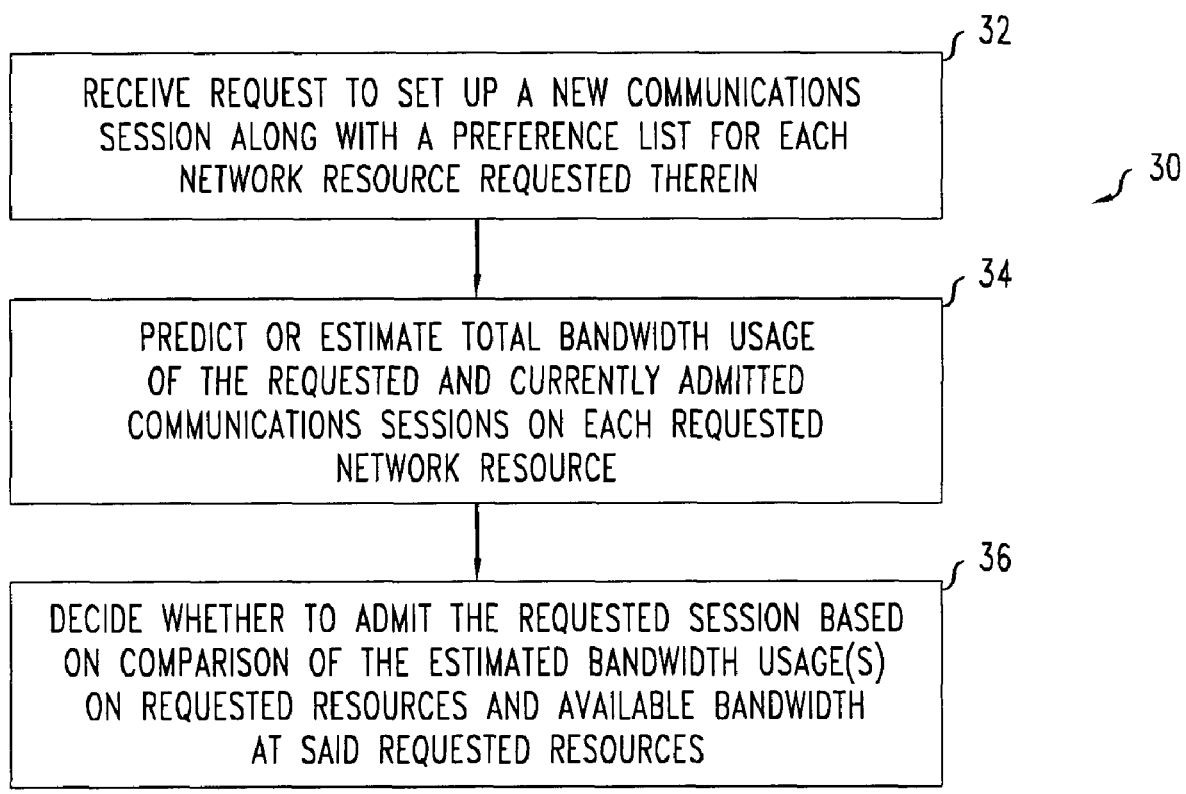
FIG. 3C is a flowchart illustrating a method for deciding whether to admit a communications session onto a data network, e.g., the data network of FIGS. 1-2.

FIG. 3C illustrates a method 30 for deciding whether to admit a new communications session to a data network as described, e.g., in step E of FIG. 2, step 23 of FIG. 3A and/or step 28 of FIG. 3B.

The method 30 includes receiving a request to set up the new communications session (step 32). The request includes one or more preference lists, i.e., one such list for each network resource requested for the communications session. The network resources are, e.g., ports on network nodes. Each preference list is an ordered sequence of one or more elements where each element defines values of one or more session parameters that relate to the particular network resource. In a preference list, the ordering of the elements indicates a statistical preference in the sense that the probability of selecting the set of session parameters of any element therein is ordered. Indeed, changing the order of the elements in a preference list typically changes the relative probabilities that the corresponding sets of session parameters will be used while the associated communications session is admitted to the data network. The one or more parameters explicitly or implicitly represent a potential bandwidth usage of the network resource by the communications session. The parameters may also identify a software and/or a hardware device used by the communications session, e.g., a device that handles one media type received at the corresponding network resource. During a communications session, the session parameters may change between those of different elements of the one or more preference lists, e.g., the resulting bandwidth usage may change at the transport plane.

Examples of preference lists include the lists in SDP messages that source and/or destination nodes exchange with the service plane during the negotiations of session parameters, e.g., as in steps A and C of FIG. 2. In particular, each media type, an SDP message effectively has a line of the following form:

m=media_type port_Id protocols cId 1 cId 2 cId 3 . . .

Here, media_type identifies the media type to be transmitted, e.g., video or audio, port_Id identifies a port on a node that will receive the media type, and cId 1, cId 2, . . . cIdN are identifiers of codecs that may be used to process the received data of the specified media type at the specified node's port. Since each codec, i.e., cId 1 . . . , of the list typically has a required effective input bandwidth, the communications session will use the required effective input bandwidth for the cIdk while the codec cIdk is being used. For that reason, corresponding to such an ordered list of codecs is a corresponding implied ordered list of potential bandwidth usages, i.e., $B_1 \ldots B_N$. The K-th bandwidth, $B_K$, on the ordered list of bandwidth usages is the required input bandwidth for the K-th codec.

The method 30 includes providing a prediction of the total bandwidth usage for each network resource that is requested for the new communications session (step 34). Here, each prediction is for the total bandwidth usage that would result from the new and currently admitted communications sessions together if the request for admission of the new communications session were granted. For any network resource, the prediction involves estimating probable bandwidth usage of the network resource by one or more communications sessions and in some embodiments, also involves measuring the bandwidth usage of the network resource by one or more other communications sessions. In embodiments where the estimation is based on one or more measured bandwidth usages, the measurements may be averaged over a selected recent time interval. The performance of such measurements may include monitoring bandwidth usages of various network resources, e.g., at edges of the network. In some embodiments, the prediction of each total bandwidth usage is based on probability distributions for bandwidth usages by the various communications sessions, and the parameters defining the probability distributions are in one or more of the messages that request or reply to a request for the admission of the new communications session. Alternately, the parameters defining such probability distributions may be predicted based on the implied order in each preference list.

The method 30 includes deciding whether to admit the requested new communications session based on a comparison of the predicted total bandwidth usage at each such requested network resource and the currently available bandwidth at each such network resource (step 36). If the prediction of the total bandwidth usage at one requested network resource is greater than the currently available, i.e., unused, bandwidth at that network resource, the performance of step 36 typically involves deciding to not admit the requested new communications session. If the prediction of the total bandwidth usage at each requested network resource is less that the currently available, i.e., unused, bandwidth at each such network resource, the performance of step 36 may include admitting the requested new communications session. That is, in this case, the new communications session will be admitted if any other conditions on the admission of the new communications session are also satisfied.

At step 34, the method 30 includes producing probability distribution(s) that estimate total bandwidth usage(s) for specific network resource(s) either based on preference list(s) that correspond to the network resource(s) or based on a known probability distribution(s) for such bandwidth usage(s) on the specific network resource(s). Such preference lists or known probability distributions for the bandwidth usages may be included in the service-plane requests and/or replies at step A and/or C of FIG. 2 and may be included in the admission request to the resource control function at step D of FIG. 2.

One method for predicting a probability distribution for the bandwidth usage of a network resource by a specific communication session is based on the preference list of the communication session. This method produces a predicted bandwidth usage that is both less than or equal to the largest bandwidth on the preference list and is greater than or equal to the ordinary uniform average of the bandwidth usages of the preference list. Such a predicted probability distribution for bandwidth usage is based on general order of preference information that is typically inherent in a preference list as discussed below.

In particular, a preference list orders its elements in order of decreasing probable use during the communications session. Thus, a preference list of N elements will provide a corresponding sequence $B_1, B_2, \ldots B_N$ where each $B_k$ is the parameter for the potential bandwidth usage at an associated network resource for the k-th element of the preference list. Corresponding to the sequence $B_1, B_2, \ldots B_N$ of potential bandwidth usages is a second sequence of bandwidth usage probabilities $P_1, P_2, \ldots P_N$. The bandwidth usage probabilities $P_1, \ldots P_N$ may or may not be specified in any service-level message that defines a preference list. Each member $P_j$ of the second sequence is a probability that the communications session will use the corresponding bandwidth $B_j$ of the first sequence. Due to the inherent ordering in the preference list, the probability $P_j$ that the j-th bandwidth will be used by the communications session is greater than or equal to the probability, $P_i$, that the i-th bandwidth will be used by the communications session if j<i. That is, $P_1 \geq P_2 \geq \ldots \geq P_N \geq 0$. Furthermore, the sum of the probabilities satisfies $P_1 + P_2 + \ldots + P_N = 1$. With these definitions the prediction of the probability distribution of bandwidth usage by the communications session is given by the least upper bounding function $P_{LUB}[x]$ of the tail probability functions $P[x]$. Here, each tail probability function $P[x]$ is defined by:

$$P[x] = P_1 \cdot \Theta(B_1 - x) + P_2 \cdot \Theta(B_2 - x) + \ldots + P_N \cdot \Theta(B_N - x).$$

Herein, the step function $\Theta(y)$ satisfies $\Theta(y) = 1$ for $y > 0$ and satisfies $\Theta(y) = 0$ for $y < 0$. Each tail probability function $P[x]$ is a non-increasing, piecewise constant function of the total used bandwidth "x" and is a linear function of components of the usage probabilities vector $(P_1, P_2, \ldots, P_N)$. Each tail probability function $P[x]$ also has a jump discontinuity at each bandwidth usage "x" that satisfies $x = B_k$ for $k = 1, 2, \ldots, N$.

The lowest upper bounding function $P_{LUB}[x]$ for the tail probability functions, i.e., the $P[x]$'s, provides the above-described prediction for the probability distribution of bandwidth usage at the network resource during the corresponding communications session.

Each tail probability $P[x]$ may be directly evaluated in embodiments where both the potential bandwidth usage vector $(B_1, \ldots, B_N)$ and the usage probabilities vector $(P_1, \ldots, P_N)$ are known or explicitly calculable. In some embodiments, the usage probabilities vector $(P_1, P_2, \ldots, P_N)$ is not known to the control entity that decides whether to admit a communications session. Indeed, the session-plane request and reply messages for admitting a session may not provide the parameters needed to explicitly define such a usage probabilities vector. In such embodiments, the least upper bounding function $P_{LUB}[x]$ for the tail probabilities $P[x]$ may still be evaluated by using the constraints that define the N−1 dimensional region in which the $P_j$'s lie. This region is a polytope located in the (N−1)-dimensional plane defined by $1 = P_1 + \ldots + P_N$. The edges of this polytope are defined by the constraints: $P_1 \geq P_2 \geq \ldots \geq P_N \geq 0$, which are typically inherent in the ordering of elements of a preference list.

Since the tail probability functions $P[x]$ are linear functions of the component $P_m$'s for fixed bandwidth usage "x", each $P[x]$ will have its largest value at one of the corners of the above-described polytope to which usage probabilities vector $(P_1, \ldots, P_N)$ are confined. The N corners of this polytope are the N-dimensional vectors defined by $P_j = 1/m$ for $j = 1 \ldots m$ and else $P_j = 0$ for each integer m satisfying $m = 1, \ldots, N$. The least upper bounding function $P_{LUB}[x]$ for the tail probability functions $P[x]$ is found by evaluating a $P[x]$ at a corner of the above-described polytope and then, defining the least upper bound function to be the function that is the least upper bound on the tail probability functions $P[x]$ at those corners. From the above description of the corners of the polytope, the evaluation of the least upper bounding function, $P_{LUB}[x]$, is straight forward.

Figure 4:
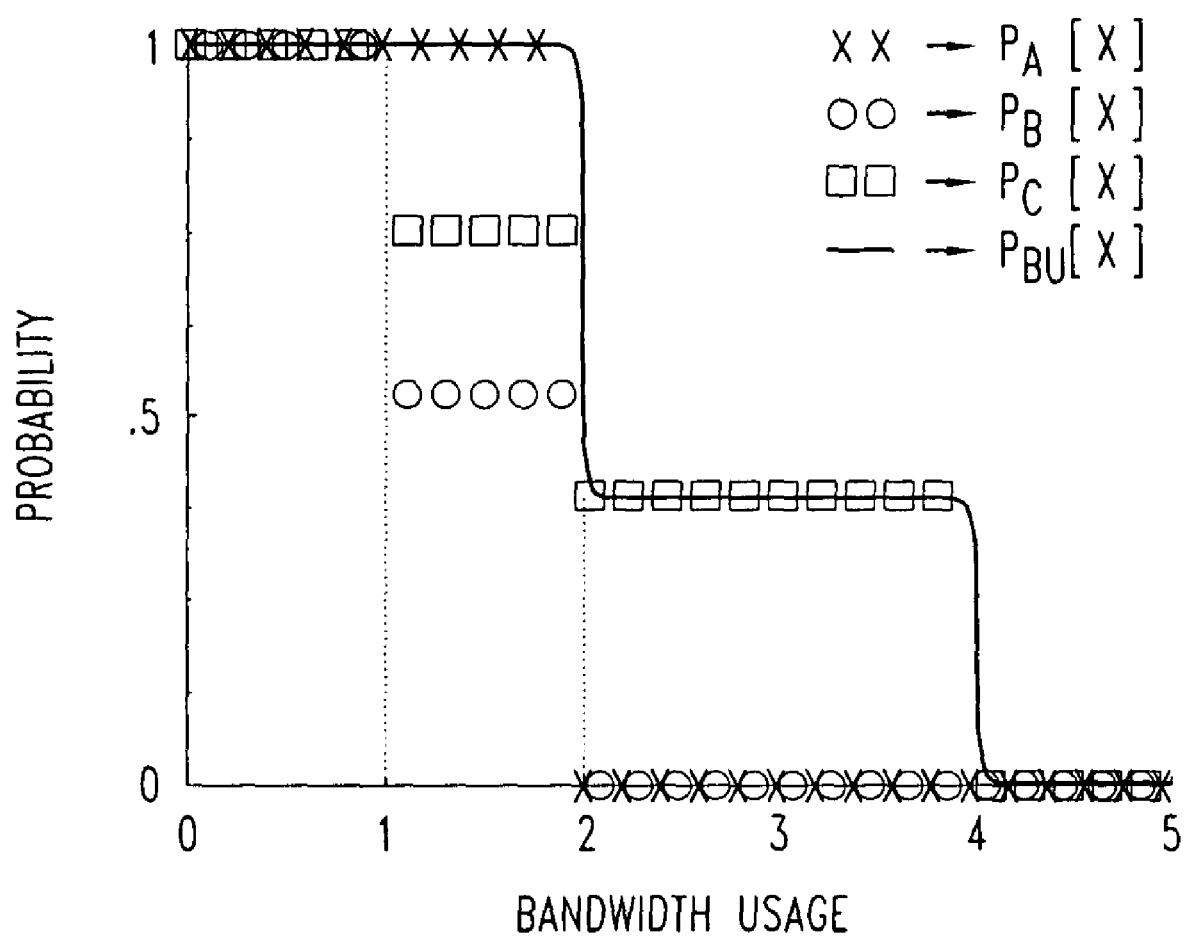
FIG. 4 plots tail probability distributions for bandwidth usages derived from a preference list with three elements and also plots a least upper bounding function for said exemplary tail probability functions.
Figure 5:
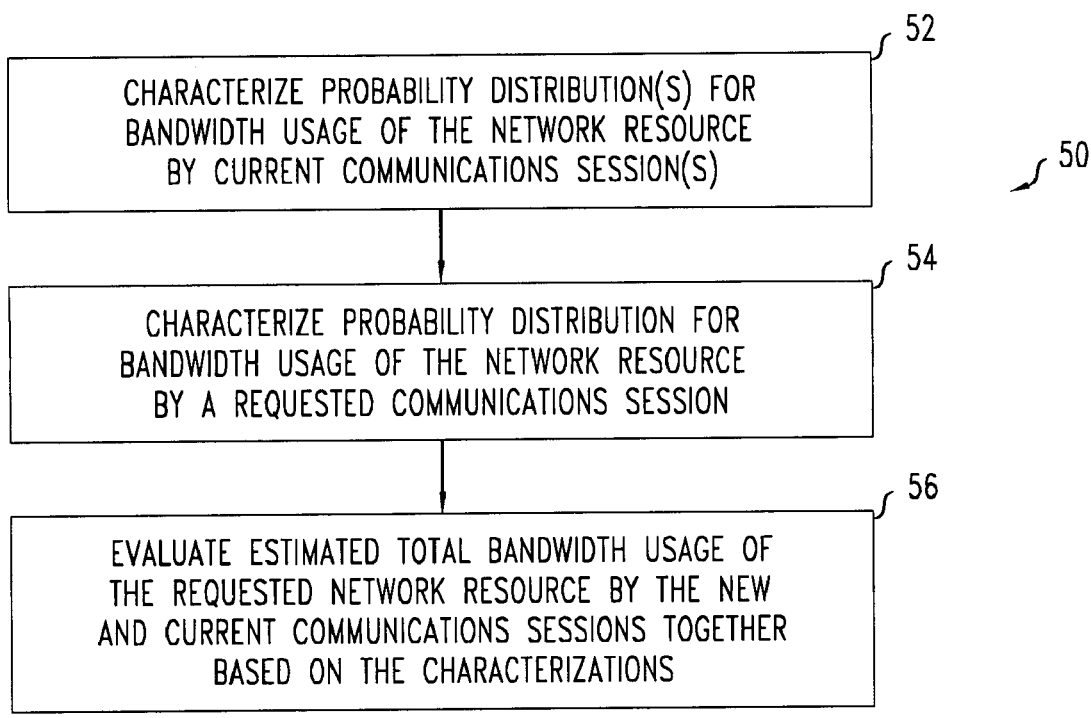
FIG. 5 is a flowchart that illustrates one method for estimating or predicting the total bandwidth usage on a resource by current and new communications sessions, e.g., as performed in the method of FIG. 3C.

FIG. 4 illustrates the above-method for providing a predictions of the bandwidth usage of a communications session for a preference list with three elements, wherein the preference list corresponds to the potential bandwidth usage vector (2, 1, 4). For this potential bandwidth usage vector, the 2-dimensional polytope to which the bandwidth usage probabilities are constrained has corners at the probability vectors A, B, and C, where A=(1, 0, 0), B=(½, ½, 0), and C=(⅓, ⅓, ⅓). Each such corner defines a tail distribution function for the potential bandwidth usage by the corresponding communications session. The corner tail-distribution functions, $P_A[x]$, $P_B[x]$, and, $P_C[x]$ are given by:

$$P_A[x] = \Theta(2-x),$$

$$P_B[x] = [½] \cdot [\Theta(2-x) + \Theta(1-x)], \text{ and}$$

$$P_C[x] + [⅓] \cdot [\Theta(2-x) + \Theta(1-x) + \Theta(4-x)]$$

and are plotted in FIG. 5. The least upper bounding function $P_{LUB}[x]$ of these three tail functions is also easily evaluated as shown in FIG. 5. The least upper bounding function $P_{LUB}[x]$ is also a non-increasing, piecewise constant function in the potential bandwidth usage and has a possible drop at each potential bandwidth usage of the preference list, e.g., possible drops at 1, 2, and 4 in this example. Thus, from FIG. 5 or from the above definitions of the tail probability functions at the corners of the polytope, it follows that the least upper bounding function $P_{LUB}[x]$ has the value 1 for $x \in [0, 2)$, the value ⅓ for $x \in (2, 4)$, and the value 0 for $x > 4$. Thus, the prediction of the probability distribution function for potential bandwidth usage, $P_{LUB}[x]$, by the corresponding communications session is given by:

$$P_{LUB}[x] = [⅔][\Theta(2-x)] + [⅓][\Theta(4-x)].$$

This probability distribution function for potential bandwidth usage provides a lower average potential bandwidth usage than the least upper bound of the potential bandwidth usages of the preference list. In this example, this later value is the least upper bound of components of (2, 1, 4), which is 4. This prediction, i.e., $P_{LUB}[x]$, for the probability distribution function of potential bandwidth usage also provides a higher aver potential bandwidth usage than the uniform estimate for the probability distribution of potential bandwidth usage. In this example, the uniform estimate would be the tail probability function given by:

$$P_{UE}[x] = [⅓][\Theta(2-x) + \Theta(1-x) + \Theta(4-x)].$$

The $P_{LUB}[x]$ probability distribution functions can be used to predict bandwidth usages at individual network resources by individual communications sessions, e.g., in method 30 of FIG. 3C.

One method uses one or more $P_{BU}[x]$'s to predict such bandwidth usages at a network resource. In addition, the method predicts a total bandwidth usage at the network resource by a set of simultaneously active communications sessions when the set includes the requested new communications session and the currently admitted communications session(s). The method 50 provides one exemplary way of performing step 34 in the method 30 as shown in FIG. 3C.

The method 50 includes characterizing probability distribution(s) that predict or estimate a potential bandwidth usage at the network resource by the currently admitted communications session(s) (step 52). The characterization may include determining the least upper bounding function $P_{LUB}[x]$ for the tail probability functions $P_{BU}[x]$ of each current communications session that may use this network resource, e.g., each session that has a preference list for this network resource. Each such least upper bounding function $P_{LUB}[x]$ is found from the preference list of the corresponding communications session as described above. Based on the appropriate $P_{LUB}[x]$, the step of characterizing of each such probability distribution may include, e.g., determining the average bandwidth usage corresponding to the $P_{LUB}[x]$ and may also include determining a standard deviation corresponding to the same $P_{LUB}[x]$.

The method 50 includes characterizing a probability distribution that predicts or estimates potential bandwidth usage at the same network resource by the requested new communications session (step 54). The characterization includes, e.g., determining the least upper bounding function, $P_{LUB}[x]$, for the tail probability functions, i.e., the P[x]'s, for the potential bandwidth usage at the same network element by the requested new communications session. This least upper bounding function $P_{LUB}[x]$ is found from the preference list of the requested new communications session as described above. Based on the $P_{LUB}[x]$, the step of characterizing of this probability distribution may also include, e.g., determining the average bandwidth usage corresponding to this $P_{LUB}[x]$ and may also include determining a standard deviation corresponding to this same $P_{LUB}[x]$.

The method 50 includes evaluating an predicted total bandwidth usage of the same network resource by the requested new and currently admitted communications session(s) together (step 56). The evaluation of this prediction is performed as if the requested new communications session were actually admitted. The prediction of this total bandwidth usage is based on characterizations of the individual communications-session probability distributions that were performed at steps 52 and 54. The predicted total bandwidth usage is found from a probability distribution for the total bandwidth usage, which is itself formed from the independent sessions' probability distributions for bandwidth usage, i.e., the $P_{LUB}[x]$'s of the individual communications session. If the total number of currently admitted communications sessions is large, e.g., about 50 or more such sessions use the requested network resource, then, the Gaussian approximation may be used to combine the various probability distributions of the individual communications sessions, i.e., the $P_{LUB}[x]$'s. In some embodiments, the central limit theorem is used to obtain the average total bandwidth usage of the network resource and the associated standard deviation from the probability distributions for potential bandwidth usage by the individual communications sessions, i.e., the $P_{LUB}[x]$'s. If the total number of communications sessions is not large, the probability distributions of the individual communications sessions may be combined by other methods known to those of skill in the art to obtain a probability distribution for the total bandwidth usage at the network resource. The probability distribution for the total bandwidth usage then, may be used to obtain various predictions about the total bandwidth usage on the network resource. In some embodiments, the prediction is that the total bandwidth usage of the network resource will be the average bandwidth usage as determined from the combined probability distribution. In other embodiments, exemplary predictions are that the total bandwidth usage of the network resource is the average bandwidth usage plus M times the standard deviation as determined from the probability distribution for the total bandwidth usage of the network resource. In such embodiments, M may be a small positive number such as 1, 2, 3, or 4.

Other embodiments predict the total bandwidth usage of a network resource by modifications of the method 50 of FIG. 5 in which steps 52 and 56 are changed. In such embodiments, the modified step 52 may involve measuring bandwidth usages of the network resource by some or all of the currently admitted communications sessions. For example, such measurements may be performed by network monitoring at the transport plane in FIG. 2. In such embodiments, the least upper bounding function(s) $P_{LUB}[x]$ for the new communications session and some or none of the currently admitted communications sessions are used in conjunction with measured bandwidth usages for the remainder of the currently admitted communications sessions to predict the total bandwidth usage at the network resource when the new and current communications sessions are simultaneously admitted. Again, a Gaussian approximation/central limit theorem approach could be used to arrive at such a prediction of the total bandwidth usage. One of skill in the art would understand how to make such a prediction or estimate in light of the disclosure herein.

Yet other embodiments predict the total bandwidth usage of a network resource based on known actual probability distributions for the potential bandwidth usage of said network resource. In such embodiments, each preference list explicitly or inherently defines both the potential bandwidth usage vector $(B_1, \ldots, B_N)$ and the usage probabilities vector $(P_1, \ldots, P_N)$ for each network resource used by the communications session. That is, such information is directly exchanged by the session-plane messages that are involved with admitting the individual sessions. Then, these explicit individual probability distributions can be combined by methods known to those of skill in the art to obtain a probability distribution for the total potential bandwidth usage of the network resource by the requested new communications session and the currently admitted communications session(s) together. For example, the Gaussian approximation and/or central limit theorem can be used to make such a combination. The probability distribution function can then, be used to make the prediction for the total bandwidth usage as required at the step 34 of FIG. 3C. A exemplary predictions may be that the total bandwidth usage of the network resource is its average bandwidth usage plus M times the standard deviation as determined from the probability distribution for the total bandwidth usage. In such embodiments, M may be a small positive number such as 1, 2, 3, or 4.

From the disclosure, drawings, and claims, other embodiments of the invention will be apparent to those skilled in the art.

What is claimed is:

1. A method, comprising:
   in a data network, receiving a request for admission of a new communications session to the data network, the request for admission being such that the new communications session will be granted a first set of bandwidth usages of a node resource of the network in response to being admitted, each of one or more admitted communications sessions concurrently having a granted set of one or more bandwidth usages of the node resource; and
   admitting the new communications session to the data network in response to a sum being larger than an effective input bandwidth of the node resource, the sum summing the largest bandwidth usage in each of the sets; and wherein each admitted communications session is able to access a bandwidth of the node resource up to any one of the one or more bandwidth usages of its own one of the sets.

2. The method of claim 1, wherein the admitting includes predicting a total bandwidth usage of the node resource by the new communications session.

3. The method of claim 1, wherein the node resource includes ports on nodes in the data network.

4. The method of claim 1, wherein the request indicates a probability that each bandwidth usage of the set in the request will be used by the communications session in response to the requested new communications session being admitted to the network.

5. The method of claim 1, wherein the request is received at a service plane of the network.

6. The method of claim 1, wherein each set is a preference list.

7. The method of claim 2, wherein each set is a preference list.

8. The method of claim 7, wherein the predicted total bandwidth depends on the order of the bandwidth usages in the preference lists.

9. The method of claim 1, wherein the admitting is such that the new communications session is granted another set of bandwidth usages on another node resource of the network, each of one or more admitted communications sessions concurrently having a granted another set of one or more bandwidth usages on the another node resource; and wherein another sum is larger than an effective input bandwidth of the another node resource, the another sum summing the largest bandwidth usage of each another set of one or more bandwidth usages on the another node resource; and wherein each admitted communications session is able to access bandwidth of the another node resource up to any of the one or more bandwidth usages in its own one of the another sets.

10. A method, comprising:

sending a request for admission of a new communications session to a data network, the request for admission being such that the new communications session will be granted a set of bandwidth usages of a node resource of the network in response to being admitted, each of one or more admitted communications sessions concurrently having a granted set of one or more bandwidth usages of the node resource; and from the data network, receiving a message admitting the new communications session to the data network in a case where a sum is larger than an effective input bandwidth of the node resource, the sum summing the largest bandwidth usage in the each of the sets; and wherein each admitted communications session is able to access a bandwidth of the node resource up to any of the one or more bandwidth usages in its own one of the sets.

11. The method of claim 10, wherein the node resource is ports on nodes in the data network.

12. The method of claim 10, wherein the request indicates a probability that each bandwidth usage of the set of the request will be used by the new communications session in response to the new communications session being admitted to the network.

13. The method of claim 10, wherein the sending includes sending the request to a service plane of the network.

14. The method of claim 10, wherein each set is a preference list.

15. The method of claim 10, wherein the admission grants another set of bandwidth usages on another node resource of the network to the new communications session, each of one or more admitted communications sessions concurrently having a granted another set of one or more bandwidth usages on the another node resource; and wherein another sum is larger than an effective input bandwidth of the another node resource, the another sum summing the largest bandwidth usage of the another node resource in the each of the another sets; and wherein each admitted communications session is able to access bandwidth of the another node resource up to any of the one or more bandwidth usages on the another node resource in its own one of the another sets.

16. The method of claim 1, wherein the node resource includes codecs for handling a specific media data.

17. The method of claim 1, wherein the node resource includes policing devices for monitoring communications sessions or marking devices that adjust quality-of-services of data packets.

18. The method of claim 1, wherein the node resource is ports on edge nodes of the network.

19. The method of claim 10, wherein the node resource includes codecs for handling a specific media data.

20. The method of claim 10, wherein the node resource includes policing devices for monitoring communications sessions or marking devices that adjust quality-of-services of data packets.

* * * * *